Dec. 30, 1930.    H. D. JAMES    1,786,755
ROTARY EARTH DRILLING SYSTEM
Original Filed Dec. 23, 1924

WITNESSES:
R. S. Harrison
M. Keith

INVENTOR
Henry D. James
BY
Wesley Sloan
ATTORNEY

Patented Dec. 30, 1930

1,786,755

UNITED STATES PATENT OFFICE

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA

ROTARY EARTH-DRILLING SYSTEM

Application filed December 23, 1924, Serial No. 757,597. Renewed May 21, 1930.

My invention relates to systems of motor control and it has particular relation to such systems as are employed in connection with earth drilling machine tools and similar applications.

An object of my invention is to provide electrical means for varying the pressure on the working tool in accordance with the resistance met in the operation.

Certain prior systems employ mechanical devices, comprising differential-gear mechanisms, for controlling the drilling pressure in accordance with the load, whereas, in accordance with my invention the equipment is greatly simplified by employing two alternating-current induction motors so connected as to provide an electrical differential action.

The first motor is connected to the line through a series transformer and performs the customary drilling operation, while the second motor, which governs the feeding of the drill-bit, is responsive to line voltage and also to the current traversing the above-mentioned series transformers.

Figure 1:
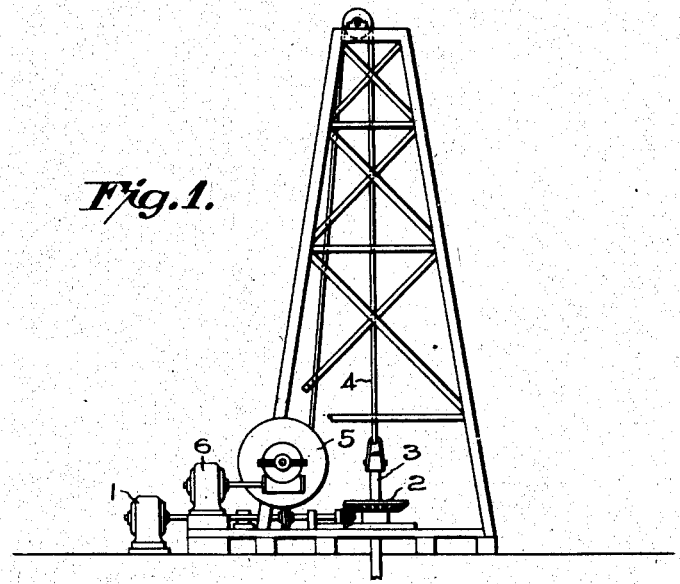
Figure 2:
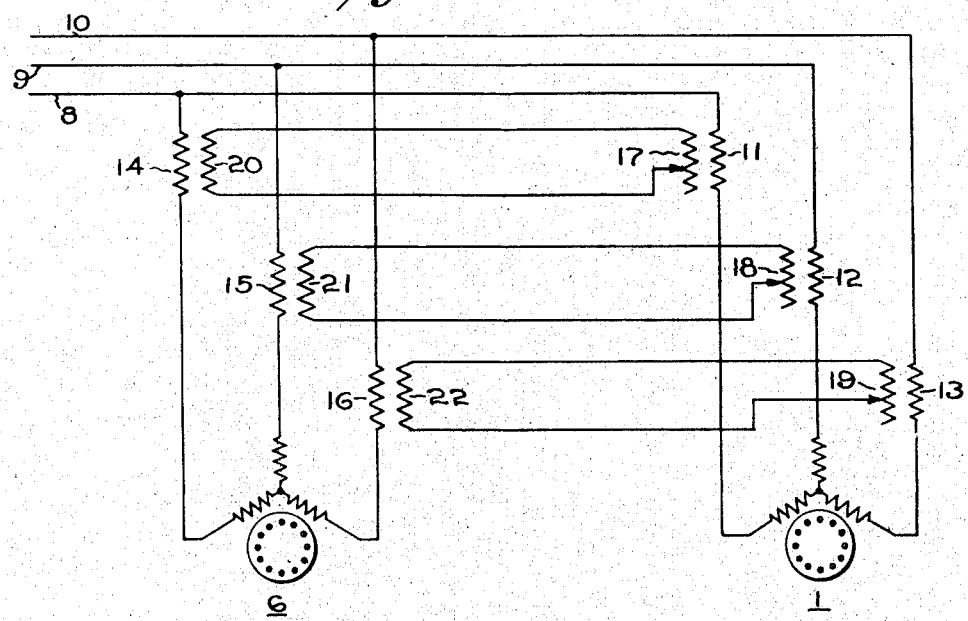

My invention will be best understood by reference to the accompanying drawing, in which Figure 1 illustrates a derrick of a familiar character that is employed in connection with rotary earth-drilling, to which my invention is applied, and Fig. 2 is a diagrammatic representation of the scheme of main-circuit connections embodying my invention.

Referring to Fig. 1, an induction motor 1 is connected through suitable gearing to operate a rotary table 2. A drill stem 3 is rotated by means of the table and is suspended by means of a cable 4 that is wound on a hoisting drum 5, in accordance with a familiar practice. The hoisting drum may be operated through any suitable gearing, or the like, by means of an induction motor 6 that is preferably of the high-resistance squirrel cage type.

The motor 6 operates on the principle of a "torque motor", whereby its torque is exerted in opposition to the weight of the suspended tool 3 and it thus functions as a "feed" motor, in conjunction with the gravity feeding of the tool itself.

A rotary drilling rig is illustrated in the copending application of Frederic W. Hild, filed Mar. 22, 1921, Serial No. 454,451, which application further illustrates the details of the rotary drilling connections and the customary means of suspending the drilling tool. In accordance with my system, however, it becomes unnecessary to furnish the differential mechanism illustrated in the above-identified application.

The primary windings of the motor 1 receive energy from line conductors 8, 9 and 10 (Fig. 2) through primary windings 11, 12 and 13 of current-transformers that are connected in the respective line conductors. The feed motor 6 is also connected to line conductors 8, 9 and 10 through primary windings 14, 15 and 16 of series transformers in a manner similar to the connections for the drilling motor 1.

When load current traverses the drilling motor, the currents traversing transformer windings 11, 12 and 13 induce voltages in the corresponding secondary transformer windings 17, 18 and 19, which windings are connected in series or loop circuits, comprising the corresponding secondary windings 20, 21 and 22, for controlling the excitation of the drilling motor 6. The windings 14 and 20 are so related that current traversing the winding 20 reduces the drop in potential across winding 14, winding 21 similarly affects the potential of winding 15 and winding 22 likewise controls the excitation of winding 16, so that the excitation of the primary winding of the feed motor 6 is varied in accordance with the load imposed on the drilling motor 1.

Under normal operating conditions, the excitation of the feed motor 6, and the torque thereof, is sufficient to partially overcome the weight of the drill 3, whereby the drilling pressure (the drill thus being fed by gravity) is determined. In the event of increased resistance being met, on account of changes in the earth formation, thereby imposing additional load on the motor 1, the load current of drilling motor 1 effects an increase in the excitation of the feed motor 6, which thereupon tends to proportionately raise the drill stem 3 and relieve the pressure on the drill-bit. When this pressure is relieved, the load on the drilling motor is of course reduced and in such manner a balanced condition is obtained between the two motors and a certain desirable drilling pressure is automatically maintained.

In other words, the electrical interconnections between the motors serve to regulate the bit pressure inversely in proportion to the hardness of the formation being cut and in a case of overload, such as a jamming of the tool, the latter is entirely retrieved or withdrawn from the work, thereby automatically relieving the overload, whereupon the tool will again advance to the work.

It is evident that the torque of the feed motor 6 may be varied, as for example, by varying the number of active turns of the secondary windings 17, 18 and 19, as indicated in Fig. 2, so that these windings become more or less effective in accordance with the load current and, therefore, correspondingly increase or reduce the excitation of the windings 20, 21 and 22 that govern the feed motor.

I have illustrated my invention in preferred form, but modifications may readily be made therein. For example the invention may be employed in various machine-tool applications. Consequently, I desire that my invention shall be limited only in accordance with the scope of the appended claims.

I claim as my invention:

1. The combination with a tool and an alternating-current motor therefor, provided with a plurality of conductors for supplying energy thereto, of a second alternating current motor for controlling the feed of said tool, a plurality of current transformers connected in the circuit of the first named motor, and means for connecting said transformers to increase and decrease the excitation of said second motor in accordance with the increase and decrease of the excitation of said first named motor.

2. The combination with a working tool, of an alternating-current-motor for operating the tool, a second alternating-current motor for feeding the tool against the work, a source of alternating-current power for the motors, individual circuits from said source to each motor, interconnected current transformers, connected in each of said individual circuits, for controlling the operation of the motor for feeding the tool in response to the load current of the motor operating the tool.

3. The combination with a tool and an alternating-current motor for operating the tool, a power source for the motor, of a motor for controlling the feeding of the tool, a plurality of current transformers connected in circuit with the tool-operating motor, and means for connecting said transformers to vary the excitation of the feed motor in response to changes in the load current of said tool-operating motor.

In testimony whereof, I have hereunto subscribed my name this 12th day of December, 1924.

HENRY D. JAMES.